(12) United States Patent
Lee et al.

(10) Patent No.: US 8,903,637 B2
(45) Date of Patent: Dec. 2, 2014

(54) SYSTEM AND METHOD FOR CALCULATING AN INSTANTANEOUS FUEL ECONOMY FOR A VEHICLE

(75) Inventors: Jin-Woo Lee, Rochester Hills, MI (US); Bakhtiar Brian Litkouhi, Washington, MI (US); Elizabeth S. Nunning, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 884 days.

(21) Appl. No.: 13/071,390

(22) Filed: Mar. 24, 2011

(65) Prior Publication Data

US 2012/0245837 A1     Sep. 27, 2012

(51) Int. Cl.
 *G06F 7/00* (2006.01)
 *G07C 5/08* (2006.01)
 *B60W 50/00* (2006.01)

(52) U.S. Cl.
 CPC ............ *G07C 5/085* (2013.01); *B60W 50/0097* (2013.01); *B60W 2520/10* (2013.01); *B60W 2520/105* (2013.01)
 USPC ...... 701/123; 340/439; 73/114.52; 73/114.53

(58) Field of Classification Search
 USPC ........................................................ 701/123
 See application file for complete search history.

(56) References Cited

U.S. PATENT DOCUMENTS

| | | | |
|---|---|---|---|
| 3,967,097 A * | 6/1976 | Moretti | 701/123 |
| 4,444,047 A | 4/1984 | Kern | |
| 4,706,083 A | 11/1987 | Baatz et al. | |
| 4,845,630 A | 7/1989 | Stephens | |
| 5,148,702 A | 9/1992 | Gulick, Jr. | |
| 5,693,876 A | 12/1997 | Ghitea, Jr. et al. | |
| 6,975,217 B2 * | 12/2005 | Endoh | 340/438 |
| 7,772,970 B2 | 8/2010 | Masuda et al. | |

(Continued)

FOREIGN PATENT DOCUMENTS

| | | |
|---|---|---|
| CN | 201646716 U | 11/2010 |
| DE | 19600495 A1 | 7/1997 |

(Continued)

OTHER PUBLICATIONS

German Patent and Trademark Office. Office Action dated Dec. 11, 2012 for Patent Application 10 2012 203 581.8.

(Continued)

*Primary Examiner* — Khoi Tran
*Assistant Examiner* — Ryan Rink
(74) *Attorney, Agent, or Firm* — Ingrassia Fisher & Lorenz, P.C.

(57) ABSTRACT

A system for calculating an instantaneous fuel economy for a vehicle is disclosed herein. The system includes, but is not limited to, a speed sensor that is configured to determine a current speed of the vehicle, an acceleration sensor that is configured to determine a current acceleration of the vehicle, a fuel sensor that is configured to determine a current fuel consumption rate of an internal combustion engine of the vehicle, a display unit, and a processor. The processor is communicatively coupled with the speed sensor, the acceleration sensor, and the fuel sensor, and is operatively coupled with the display unit. The processor is configured to determine the instantaneous fuel economy of the vehicle based on information obtained from the speed sensor, the acceleration sensor, and the fuel sensor. The processor is further configured to instruct the display unit to display the instantaneous fuel economy.

15 Claims, 3 Drawing Sheets

(56) References Cited

U.S. PATENT DOCUMENTS

| | | |
|---|---|---|
| 2009/0281715 A1 | 11/2009 | Paik |
| 2010/0036571 A1* | 2/2010 | Han et al. .................. 701/64 |
| 2010/0057281 A1 | 3/2010 | Lawyer et al. |
| 2010/0082228 A1 | 4/2010 | Lee |
| 2011/0172871 A1* | 7/2011 | Hall et al. .................. 701/29 |
| 2012/0029803 A1* | 2/2012 | Yasushi et al. ............ 701/123 |

FOREIGN PATENT DOCUMENTS

| | | | |
|---|---|---|---|
| EP | 0094370 A2 | 11/1983 | |
| JP | 58071419 A | 4/1983 | |
| JP | 2009168655 A | 7/2009 | |
| WO | 00-17610 A1 | 3/2000 | |
| WO | WO2010116492 | * 10/2010 | ............... G08G 1/00 |

OTHER PUBLICATIONS

Ahn, K., Rakha, H., Trani, A., and Van Aerde, M. (2002). "Estimating Vehicle Fuel Consumption and Emissions based on Instantaneous Speed and Acceleration Levels." J. Transp. Eng., 128(2), 182-190. doi: 10.1 061/(ASCE)0733-94 7X (2002)128:2(182) U RL: http://filebox. vt. ed u/users/hrakha/Pu blications/ ASCE%20Hybrid %20Microscopic%20Energy%20%26%20Emission%20Model.pdf (abgerufen am Nov. 12, 2012).

* cited by examiner

SYSTEM AND METHOD FOR CALCULATING AN INSTANTANEOUS FUEL ECONOMY FOR A VEHICLE

TECHNICAL FIELD

The technical field generally relates to a vehicle, and more particularly relates to a system and method for calculating an instantaneous fuel economy for a vehicle.

BACKGROUND

Many vehicles are equipped with information systems that include a gauge or read out in an instrument panel or elsewhere in a passenger compartment of a vehicle that presents a driver and/or a vehicle occupant with information about the vehicle's performance. For example, many information systems provide information such as the distance, in miles and/or hours, of a recent or current trip and the number of miles that the vehicle can travel on the fuel remaining in the vehicle's fuel tank. Another item of information commonly presented to the driver of the vehicle is the vehicle's instantaneous fuel economy. The instantaneous fuel economy is a reflection of the gas consumption that the vehicle is achieving on a moment to moment basis. It is commonly measured in miles per gallon in the United States and in liters per 100 kilometers in Europe and it permits a driver to correlate his/her driving habits with his/her vehicle's fuel economy.

The instantaneous fuel economy has historically been calculated by using information collected by the vehicle's odometer and a fuel sensor. The odometer measures how far the vehicle has traveled and the fuel sensor measures, among other things, how much fuel has been consumed by the vehicle's internal combustion engine. Conventionally, in the United States, a vehicle's instantaneous fuel economy has been determined by measuring the distance that the vehicle has traveled during a period of time (e.g. the preceding two seconds), by measuring how much fuel the internal combustion engine consumed during that same period of time, and then dividing the distance by the amount of fuel consumed. In Europe, the fuel consumed is divided by the distance traveled.

While conventional systems and methods for determining instantaneous fuel economy are adequate, there is room for improvement. The data measurements utilized by conventional systems and methods look backward in time and therefore incorporate a time lag in the calculation of the instantaneous fuel economy. For example, if the instantaneous fuel economy is calculated based on the distance traveled during the preceding two seconds and the amount of fuel consumed during the preceding two seconds, then there will be at least a two second time lag before the instantaneous fuel economy can be presented to the driver because the information system is collecting data from the various sensors.

Additionally, conventional instantaneous fuel economy measuring systems have been known to show dramatic fluctuations in fuel economy during transitional stages such as when a driver lifts his/her foot from the gas pedal to coast, change gears, or to apply the brakes. During such periods when the gas pedal has been released and the vehicle is coasting, the distance traveled by the vehicle will not differ significantly from the preceding steady-state condition, but the fuel consumption will instantly drop precipitously. Because fuel consumption is the denominator in the equation for calculating instantaneous fuel economy, when the fuel consumption gets very small, the instantaneous fuel economy appears to get unrealistically large, and it does so very quickly.

Because of the time lag, the rapid fluctuations in instantaneous fuel economy, and the magnitude of such fluctuations associated with conventional systems and methods for determining instantaneous fuel economy, it is desirable to provide a system and method that addresses these concerns. Furthermore, other desirable features and characteristics will become apparent from the subsequent detailed description and the appended claims, taken in conjunction with the accompanying drawings and the foregoing technical field and background.

SUMMARY

Various embodiments of a system and a method for calculating an instantaneous fuel economy for a vehicle are disclosed herein.

In an embodiment, the system includes, but is not limited to, a speed sensor configured to determine a current speed of the vehicle, an acceleration sensor configured to determine a current acceleration of the vehicle, a fuel sensor configured to determine a current fuel consumption rate of an internal combustion engine of the vehicle, a display unit, and a processor. The processor is communicatively coupled with the speed sensor, the acceleration sensor, and the fuel sensor, and is operatively coupled with the display unit. The processor is configured to determine the instantaneous fuel economy of the vehicle based on information obtained from the speed sensor, the acceleration sensor, and the fuel sensor. The processor is further configured to instruct the display unit to display the instantaneous fuel economy.

In another embodiment, the method includes, but is not limited to the steps of detecting a current speed of the vehicle, a current acceleration of the vehicle, and a current fuel consumption rate of an internal combustion engine of the vehicle, calculating with a processor the instantaneous fuel economy of the vehicle by utilizing the current speed of the vehicle, the current acceleration of the vehicle, and the current fuel consumption rate of the internal combustion engine of the vehicle, and displaying the instantaneous fuel economy of the vehicle.

In yet another embodiment, the method includes, but is not limited to the steps of detecting a current speed of the vehicle, a current acceleration of the vehicle, and a current fuel consumption rate of an internal combustion engine of the vehicle, calculating with a processor the instantaneous fuel economy of the vehicle by utilizing the current speed of the vehicle, the current acceleration of the vehicle, and the current fuel consumption rate of the internal combustion engine of the vehicle, displaying the instantaneous fuel economy of the vehicle when the current speed exceeds a predetermined speed, and displaying the current fuel consumption rate when the current speed is less than the predetermined speed.

DESCRIPTION OF THE DRAWINGS

One or more embodiments will hereinafter be described in conjunction with the following drawing figures, wherein like numerals denote like elements.

DETAILED DESCRIPTION

Figure 1:
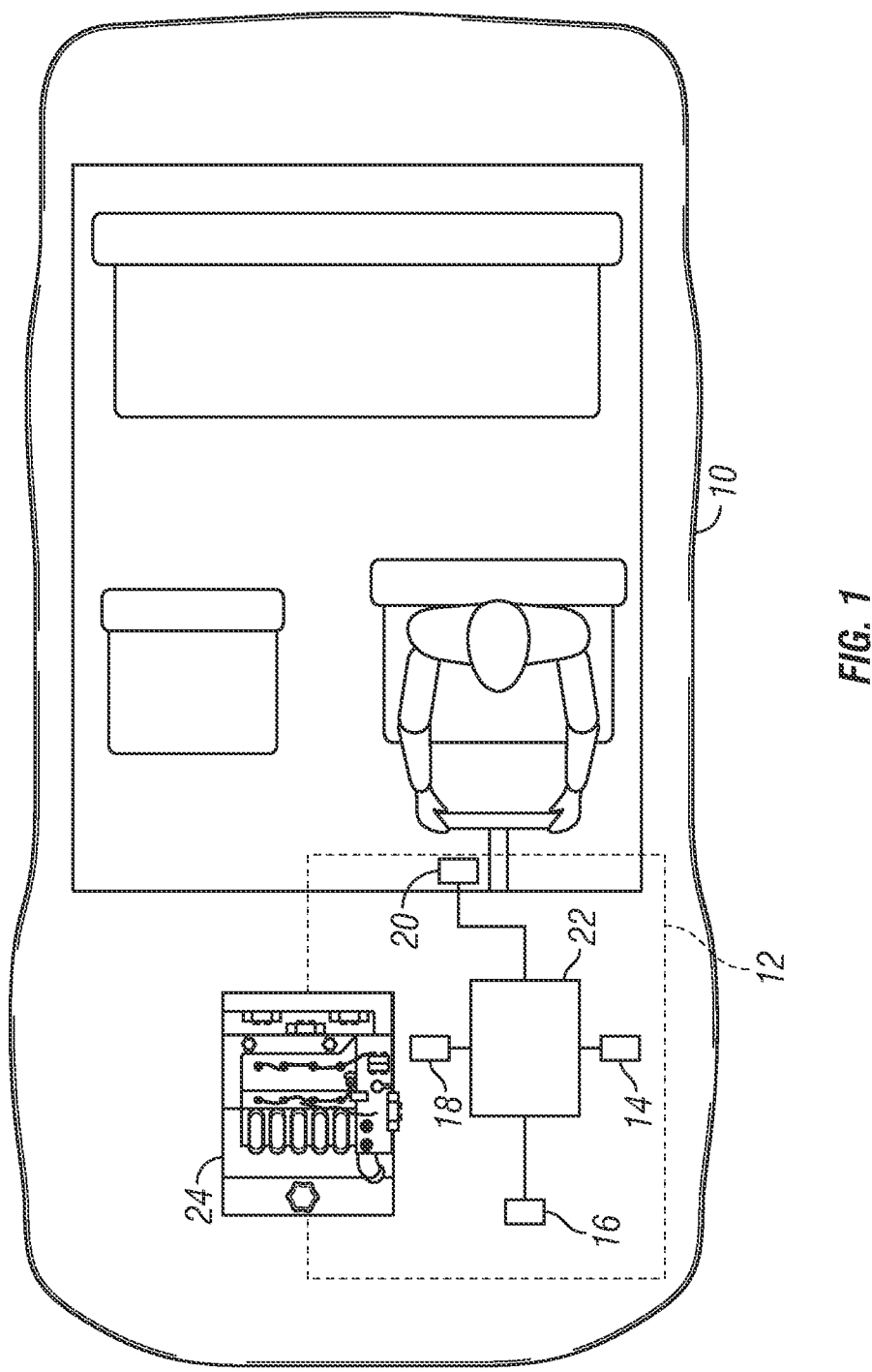
FIG. 1 is a schematic view of a vehicle equipped with an embodiment of a system for calculating an instantaneous fuel economy.

The following detailed description is merely exemplary in nature and is not intended to limit application and uses. Furthermore, there is no intention to be bound by any expressed or implied theory presented in the preceding technical field, background, brief summary or the following detailed description.

An improved system and method for calculating an instantaneous fuel economy for a vehicle is disclosed herein. The system includes a speed sensor, an acceleration sensor, a fuel sensor, a display unit, and a processor. The processor is communicatively coupled with the speed sensor, the acceleration sensor, and the fuel sensor, and is operatively coupled to the display unit. The speed sensor is configured to determine a current speed of the vehicle and to transmit the current speed of the vehicle to the processor. The acceleration sensor is configured to detect an acceleration of the vehicle. In an embodiment, the acceleration sensor will be configured to detect acceleration of the vehicle in a direction parallel to a direction of vehicle travel (e.g., acceleration in the same direction as the direction of vehicle travel or in a direction opposite to the direction the vehicle travel). The acceleration sensor is configured to transmit the current acceleration of the vehicle to the processor. The fuel sensor is configured to detect a current rate of fuel consumption of the internal combustion engine of the vehicle and to transmit the current rate of fuel consumption to the processor.

The processor is configured to receive the current vehicle speed, the current vehicle acceleration, and the current rate of fuel consumption of the internal combustion engine, and is further configured to utilize this information to calculate an instantaneous fuel economy that the vehicle will experience during a future period of time (e.g., the next two seconds). In this manner, the system for calculating an instantaneous fuel economy disclosed herein "predicts" what the fuel economy will be in the immediate future and thus avoids the two second lag time associated with conventional systems that calculate instantaneous fuel economy.

The processor is configured to calculate the distance that the vehicle will travel during the future period of time based on the vehicle's current speed and current acceleration. The processor is further configured to calculate the amount of fuel the vehicle will consume during the future period of time based on the current rate of fuel consumption. Once the distance and the fuel consumed have been calculated, the system is configured to calculate the instantaneous fuel economy. In some embodiments, the system may be further configured to multiply the instantaneous fuel economy by a conversion factor to convert the instantaneous fuel economy into units of either the U.S. system or the metric system.

A further understanding of the above described system and method for calculating the instantaneous fuel economy of a vehicle may be obtained through a review of the illustrations accompanying this application together with a review of the detailed description that follows.

FIG. 1 is a schematic view of a vehicle 10 equipped with an embodiment of a system 12 for calculating an instantaneous fuel economy. As used herein, the term instantaneous fuel economy shall refer to an assessment of the fuel economy of a vehicle over a relatively short, and chronologically proximate, period of time. In an example, the instantaneous fuel economy for a vehicle would cover a period of time of just a few seconds and would be displayed to a driver and/or occupant of the vehicle substantially contemporaneously with the measurements taken to perform the calculation of the vehicle's fuel economy.

Although vehicle 10 is depicted as being a passenger sedan, it should be understood that the teachings herein are compatible with any type of automobile including passenger cars, vans, minivans, motorcycles, trucks, buses, military vehicles, and any other ground-based vehicle that utilizes an internal combustion engine. Furthermore, the teachings herein are not limited to use with automobiles or other ground-based vehicles, but may also be utilized by aircraft, water craft and/or spacecraft.

System 12 includes a speed sensor 14, an acceleration sensor 16, a fuel sensor 18, a display unit 20, and a processor 22. In other embodiments, system 12 may include additional components such as multiple processors 22, multiple fuel sensors 18, multiple speed sensors 14 and multiple acceleration sensors 16. In still other embodiments, system 12 may include a memory device operatively coupled with processor 22 and configured to store electronic data corresponding to previously calculated instantaneous fuel economies. In still other embodiments, additional components effective to assist processor 22 in calculating the instantaneous fuel economy or in reporting the instantaneous fuel economy to a driver and/or occupant of vehicle 10 may also be employed without departing from the teachings of the present disclosure.

Speed sensor 14 may be any mechanism or device that is effective to detect, assess, and/or determine the speed of vehicle 10 as it moves in the direction of vehicle travel (e.g., either forward or reverse). Speed sensors are well-known in the industry.

Acceleration sensor 16 may be any mechanism or device that is effective to detect, assess, and/or determine the acceleration of vehicle 10 as it accelerates and/or decelerates (referred to herein as acceleration) in the direction of vehicle travel. Acceleration sensors are well-known in the industry.

Fuel sensor 18 may be any mechanism or device that is effective to detect, assess, and/or determine the rate at which an internal combustion engine 24 of vehicle 10 consumes fuel and/or the amount of fuel that fuel injectors provide to internal combustion engine 24 as internal combustion engine 24 is operated. By differentiating the amount of fuel provided by the fuel injectors, the rate of fuel consumption can be determined Fuel sensors are well-known in the industry. In other embodiments, fuel sensor 18 may be used with hybrid electric vehicles, battery electric vehicles, vehicles powered by hydrogen fuel cells, or any other type of motor to detect the rate at which power and/or energy is consumed by the motor.

Display unit 20 may be any type of display device that generates visual output using any one of a number of different technologies. For example, display unit 20 may be a Cathode Ray Tube (CRT) display device, a flat panel display device, a Liquid Crystal Display (LCD) device, a plasma display device, an electro-luminescent display device, a Light Emitting Diode (LED) display device, a holographic display device such as a Head Up Display (HUD), a Micro Mirror Device (MMD) display device, or the like. In many instances, vehicle 10 will have a display unit already mounted in an instrument panel or overhead display and a separate, dedicated display unit for system 12 will not be necessary. In other instances, the instantaneous fuel economy can be wirelessly transmitted to a mobile device such as a smart phone and presented on the smart phone's display. Similarly, through the use of commercially available telematics services systems, instantaneous fuel economy information can be emailed to the driver and displayed on the display screen of any mobile device configured to receive and display emails.

Processor 22 may be any type of computer, computer system, or microprocessor that is configured to perform algorithms, to execute software applications, to execute sub-routines and/or to be loaded with and to execute any other type of computer program. In some embodiments, processor 22 may comprise only a single component. In other embodiments, processor 22 may comprise a plurality of components acting in concert. In some embodiments, processor 22 may be dedicated for use exclusively with system 12 while in other embodiments, processor 22 may be shared with other systems on board vehicle 10.

Processor 22 is communicatively coupled to speed sensor 14, acceleration sensor 16, fuel sensor 18, and is operatively coupled to display unit 20. Such communicative and/or operative coupling may be achieved through the use of any suitable means of transmission including both wired and wireless connections. For example, each component may be physically connected to processor 22 via a coaxial cable or via any other type of wire connection effective to convey signals. In the illustrated embodiment, processor 22 is directly communicatively connected to each of the other components. In other embodiments, each component may be communicatively connected to processor 22 across a vehicle bus. In still other examples, each component may be wirelessly communicatively coupled to processor 22 via a Bluetooth connection, a WiFi connection, an infrared connection, or the like.

Being communicatively coupled provides a pathway for the transmission of commands, instructions, interrogations and other signals between processor 22 and each of the other components. Through this pathway, processor 22 may control and/or communicate with each of the other components.

Speed sensor 14, acceleration sensor 16, and fuel sensor 18, are each configured to generate signals corresponding to the detected speed, acceleration, and rate of fuel consumption, respectively, of vehicle 10. These signals are transmitted to processor 22. In some embodiments, speed sensor 14, acceleration sensor 16, and/or fuel sensor 18 may be configured to automatically transmit their respective signals to processor 22 while in other embodiments, processor 22 may be configured to interrogate speed sensor 14, acceleration sensor 16, and/or fuel sensor 18 to obtain their respective signals.

Processor 22 is configured to determine the instantaneous fuel economy of vehicle 10 in response to receiving the respective signals from speed sensor 14, acceleration sensor 16, and fuel sensor 18. Processor 22 may use the information contained in the respective signals to perform various calculations. In one example, processor 22 is configured to utilize the current speed and current acceleration of vehicle 10 to calculate the distance that vehicle 10 will travel during a future period of time and to utilize the current rate of fuel consumption of internal combustion engine 24 to calculate the amount of fuel that will be consumed during the future period of time.

The duration of the future period of time may be predetermined or it may be calculated. For example, in some embodiments, the future period of time may be a two second period immediately following the collection of data by the sensors. In other examples, the future period of time may be any other suitable duration. In still other embodiments, the future period of time may be the amount of time required for the vehicle to come to a complete stop and may be calculated by processor 22 by dividing the current speed of the vehicle 10 by the current acceleration of vehicle 10. Such a calculation may be made anytime the vehicle will be likely to come to a complete stop prior to the lapse of the predetermined future period of time.

The distance that vehicle 10 will travel during the future period of time may be calculated using the following equation:

$$D=(S \cdot T)+(0.5 \cdot A \cdot T^2) \qquad 1.$$

In the above equation, D represents the distance that vehicle 10 will travel during the future period of time, S represents the current speed of vehicle 10, T represents the future period of time, and A represents the current acceleration of vehicle 10.

In embodiments where the future period of time is calculated by processor 22, the future period of time may be calculated using the following equation:

$$T=S \div A \qquad 2.$$

In the above equation, T represents the future period of time, S represents the current speed of vehicle 10, and A represents the current acceleration of vehicle 10. This calculation will be undertaken only in situations where vehicle 10 is decelerating. Calculation of time in circumstances where vehicle 10 is decelerating is an alternative to the situation where T is a predetermined quantity.

The amount of fuel that will be consumed by internal combustion engine 24 during the period of time may be calculated using the following equation:

$$F=R \cdot T \qquad 3.$$

In the above equation, F represents the fuel consumed by internal combustion engine 24 during the future period of time, R represents the rate at which internal combustion engine 24 consumes fuel, and T represents the future period of time. It should be understood that this equation is just one way of calculating the fuel consumed. Other methods are also possible. For instance, the amount of fuel consumed may be calculated by integrating the fuel injection amount for time T.

The instantaneous fuel economy that vehicle 10 will experience during the future period of time may be calculated using the following equation:

$$IFE=D \div F \qquad 4.$$

In the above equation, IFE represents the instantaneous fuel economy, D represents the distance traveled by vehicle 10 during the future period of time as calculated using equation number one, above, and F represents the fuel consumed during the future period of time as calculated using equation number three, above. This equation may be used when the IFE is calculated in the United States. In other locations, such as Europe, the IFE may be determined by dividing F by D.

Once the instantaneous fuel economy has been calculated by processor 22, processor 22 is further configured to send an instruction to display unit 20 instructing display unit 20 to display the instantaneous fuel economy. In examples where a display unit 20 is a display screen mounted in the instrument panel of vehicle 10, display unit 20 may simply provide a digital readout of the instantaneous fuel economy. In other examples, display unit 20 may be a needle and gauge arrangement and processor 22 may direct display unit 20 to move the needle to indicate the instantaneous fuel economy. In other examples, display unit 20 may comprise a speaker or other device configured to emit an audible signal. In such examples, display unit 20 may announce the instantaneous fuel economy. In other examples, display unit 20 may take any other suitable form and may communicate the instantaneous fuel economy to the driver or occupant of vehicle 10 in any other suitable manner.

As set forth above, when the driver lifts his/her foot from the gas pedal, the rate at which internal combustion engine 24 consumes fuel will drop precipitously. Because fuel consumption is the denominator in the equation for calculating instantaneous fuel economy, the instantaneous fuel economy displayed to the driver of vehicle 10 may, if left unchecked, suddenly jump to very elevated levels when the driver takes his/her foot off of the gas pedal. To address this, processor 22 may be further configured to filter the display of the instantaneous fuel economy. Accordingly, processor 22 may be configured to instruct display unit 20 to limit the rate at which the instantaneous fuel economy changes. For example, processor 22 may be configured to instruct display unit 20 to display an elevating instantaneous fuel economy in increments that do not exceed a predetermined amount. Processor 22 may instruct display unit 20 to display a rising instantaneous fuel economy in increments of no greater than what the vehicle is capable of (e.g., 99 miles per gallon). This may be desirable to avoid causing the driver any confusion and may enhance the driver's ability to correlate his/her driving habits with his/her impact on the fuel economy of vehicle 10. In other embodiments, the various sensors themselves may be configured with filters to control the rate at which their respective data changes as the vehicle's dynamic condition changes.

In some embodiments, processor 22 may be configured to instruct display unit 20 to display the current fuel consumption rate instead of the instantaneous fuel economy when the current speed of the vehicle 10 falls below a predetermined speed (e.g., three kilometers per hour). This may occur because at relatively low speeds, inherent inaccuracies of speed sensor 14 may result an erroneous determination of the current speed of vehicle 10. For example, inherent inaccuracies of speed sensor 14 may cause the speed detected by speed sensor 14 to be off by one kilometer per hour. If vehicle 10 is traveling at seventy kilometers per hour, then a one kilometer per hour error is insignificant and would not substantially impact the calculation of the instantaneous fuel economy. However, if vehicle 10 is traveling at two kilometers per hour, then a one mile per hour error would have a substantial impact on the calculation of the instantaneous fuel economy. Accordingly, at relatively low speeds, it may be preferable to display the rate of fuel consumption as detected by fuel sensor 18 because fuel sensor 18 may be more accurate and/or reliable at even very slow speeds.

Figure 2:
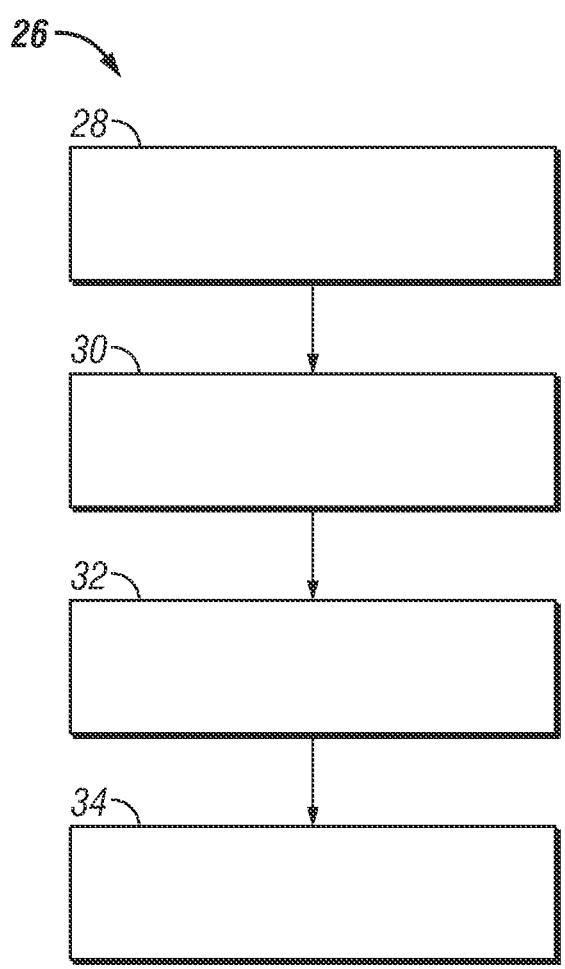
FIG. 2 is a block diagram of an example of a method for calculating an instantaneous fuel economy.

FIG. 2 is a block diagram of an example of a method 26 for calculating an instantaneous fuel economy. With continuing reference to FIGS. 1-2, at block 28, a vehicle's dynamic conditions are detected. For example, the current speed of the vehicle is detected, the current acceleration of the vehicle is detected, and the current fuel consumption rate. These dynamic conditions may be detected using sensors such as speed sensor 14, acceleration sensor 16, and fuel sensor 18, or through the use of any other suitable device or means of detection.

At block 30, a future period of time may be calculated for the purposes of calculating an instantaneous fuel economy. This step may be implemented in circumstances where the vehicle is anticipated to come to a complete stop prior to the lapse of a predetermined future period of time. This may occur, for example, in circumstances where the driver forcefully applies the brakes while traveling at a slow speed. This calculation may be performed by a processor associated with the vehicle. In such examples, the processor may be configured to solve equation number two, described above to arrive at a calculated future period of time. In circumstances where the vehicle is not anticipated to come to a complete stop prior to the lapse of the predetermined future period of time, this step illustrated in block 30 may be bypassed and the calculation of the instantaneous fuel economy may be accomplished by utilizing the predetermined future period of time.

At block 32, the instantaneous fuel economy of the vehicle is calculated. This may be accomplished through the use of a processor such as processor 22 which may receive the current speed and the current acceleration of the vehicle as well as the current rate of fuel consumption of the vehicle's internal combustion engine. The processor may be configured to use the current speed and the current acceleration of the vehicle to determine the distance that the vehicle is anticipated to travel during the future period of time by solving equation number one, described above. The processor may be further configured to use the current rate of fuel consumption to determine the amount of fuel that will be consumed by the internal combustion engine during the future period of time by solving equation number three, above. Once the processor has calculated the distance that the vehicle will travel and the amount of fuel that the vehicle's internal combustion engine will consume during the future period of time, the processor may calculate the vehicle's instantaneous fuel economy by solving equation number four, above.

At block 34, the instantaneous fuel economy is displayed to the driver or occupant of the vehicle. In some examples, the processor that calculated the instantaneous fuel economy may be operatively connected to a display unit visible in the passenger compartment of the vehicle and may instruct such display unit to visually display the vehicle's instantaneous fuel economy. Other means and methods for communicating the instantaneous fuel economy to the driver and/or occupant of the vehicle may also be employed.

Figure 3:
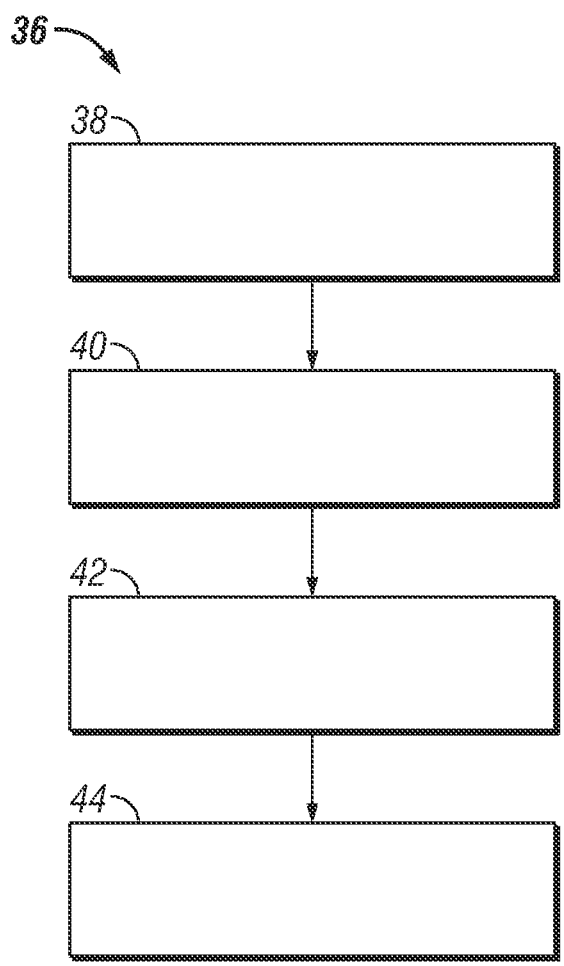
FIG. 3 is a block diagram of another example of a method for calculating an instantaneous fuel economy.

FIG. 3 is a block diagram of another example 36 of a method for calculating an instantaneous fuel economy. With continuing reference to FIGS. 1-3, at block 38, the current speed and the current acceleration of the vehicle as well as the current fuel consumption rate of the vehicle's internal combustion engine are detected as discussed above with respect to block 28.

At block 40, the vehicle's instantaneous fuel economy is calculated in the same manner as discussed above with respect to block 32. Such calculation may be based on a predetermined future period of time or a calculated future period of time, as discussed above with respect to block 30.

At block 42, the instantaneous fuel economy is displayed to a driver and/or occupant of the vehicle when the current speed of the vehicle exceeds a predetermined speed.

At block 44, the rate of fuel consumption is displayed to a driver and/or occupant of the vehicle instead of the instantaneous fuel economy. This step may be taken in circumstances where the vehicle is traveling at speeds lower than the predetermined speed. At such low speeds, the inherent inaccuracies of the speed sensor may render unreliable any instantaneous fuel economy calculated using information provided by such speed sensor. Accordingly, in such circumstances, it may be preferable to display the rate of fuel consumption for the internal combustion engine of the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A system for calculating an instantaneous fuel economy for a vehicle, the system comprising:
   a speed sensor configured to determine a current speed of the vehicle;

an acceleration sensor configured to determine a current acceleration of the vehicle;

a fuel sensor configured to determine a current fuel consumption rate of an internal combustion engine of the vehicle;

a display unit; and a processor communicatively coupled with the speed sensor, the acceleration sensor and the fuel sensor and operatively coupled with the display unit, the processor configured to determine the instantaneous fuel economy of the vehicle based on information obtained from the speed sensor, the acceleration sensor, and the fuel sensor, and the processor further configured to instruct the display unit to display the instantaneous fuel economy, wherein the processor is configured to determine the instantaneous fuel economy by calculating a distance that the vehicle will travel during a future period of time, by calculating an amount of fuel that the internal combustion engine will consume during the future period of time, and by dividing the distance by the amount of fuel, and wherein the processor is configured to determine the future period of time by dividing the current speed of the vehicle by the current acceleration of the vehicle.

2. The system of claim 1, wherein the speed sensor is configured to transmit the current speed of the vehicle to the processor, the acceleration sensor is configured to transmit the current acceleration of the vehicle to the processor, and wherein the fuel sensor is configured to transmit the current fuel consumption rate of the internal combustion engine to the processor.

3. The system of claim 1, wherein the processor is configured to determine the distance based on information obtained from the speed sensor and the acceleration sensor.

4. The system of claim 3, wherein the processor is configured to determine the distance by multiplying the current speed of the vehicle by the future period of time and adding one half of the acceleration multiplied by a square of the future period of time.

5. The system of claim 1, wherein the processor is configured to determine the amount of fuel that the internal combustion engine will consume based on information obtained from the fuel sensor.

6. The system of claim 5, wherein the processor is configured to determine the amount of fuel that the internal combustion engine will consume by multiplying the current fuel consumption rate by the future period of time.

7. The system of claim 1, wherein the future period of time comprises a predetermined period of time.

8. The system of claim 1, wherein the processor is configured to employ a filter to control a rate at which the instantaneous fuel economy changes.

9. The system of claim 1, wherein the processor is further configured to instruct the display unit to display the current fuel consumption rate when the current speed of the vehicle falls below a predetermined speed.

10. The system of claim 9, wherein the predetermined speed is three kilometers per hour.

11. A method for calculating an instantaneous fuel economy for a vehicle, the method comprising the steps of:

detecting a current speed of the vehicle, a current acceleration of the vehicle, and a current fuel consumption rate of an internal combustion engine of the vehicle;

calculating with a processor the instantaneous fuel economy of the vehicle by utilizing the current speed of the vehicle, the current acceleration of the vehicle, and the current fuel consumption rate of the internal combustion engine of the vehicle;

displaying the instantaneous fuel economy of the vehicle, wherein the calculating step comprises calculating a distance that the vehicle will travel during a future period of time, calculating an amount of fuel that the internal combustion engine will consume during the future period of time, and by dividing the distance by the amount of fuel; and calculating the future period of time with the processor, wherein the step of calculating the future period of time comprises dividing the current speed by the current acceleration.

12. The method of claim 11, wherein the processor determines the distance by multiplying the current speed of the vehicle by the future period of time and adding one half of the acceleration multiplied by a square of the future period of time.

13. The method of claim 11, wherein the processor determines the amount of fuel that the internal combustion engine will consume by multiplying the current fuel consumption rate by the future period of time.

14. The method of claim 11, wherein the future period of time comprises a predetermined period of time.

15. A method for calculating an instantaneous fuel economy for a vehicle, the method comprising the steps of:

detecting a current speed of the vehicle, a current acceleration of the vehicle, and a current fuel consumption rate of an internal combustion engine of the vehicle;

calculating with a processor the instantaneous fuel economy of the vehicle by utilizing the current speed of the vehicle, the current acceleration of the vehicle, and the current fuel consumption rate of the internal combustion engine of the vehicle;

displaying the instantaneous fuel economy of the vehicle when the current speed exceeds a predetermined speed; and displaying the current fuel consumption rate when the current speed is less than the predetermined speed.

* * * * *